Patented Oct. 10, 1950

2,525,166

UNITED STATES PATENT OFFICE 2,525,166

PROCESS FOR THE STRIPPING OF MIRROR BACKING AND COMPOSITION OF MATTER USEFUL IN SUCH PROCESS

Keith E. Brown, San Gabriel, and Francis E. Clark and Clark E. Jackson, Alhambra, Calif., assignors to Turco Products, Inc., Los Angeles, Calif., a corporation of California No Drawing. Application January 17, 1947, Serial No. 722,766

45 Claims. (Cl. 134—29)

This invention relates to processes for the removal of silver from mirrors and to compositions of matter useful in such processes. In order that our invention may be better understood, it may be useful to consider the methods now employed commercially in forming mirrors and in removing silver films from mirrors.

Processes now employed commercially in the manufacture of mirrors do not differ substantially from that originally introduced by Baron Liebig about one hundred years ago. Liebig discovered that an ammoniacal silver nitrate solution will deposit silver in the presence of a reducing agent upon a heated glass surface. The mixed ingredients are poured out on a glass to be silvered and the silver is deposited from the mixture. It is then washed and cleaned. Except for relatively minor changes in the composition of the reducing solutions, the present silvering solutions are essentially the same as used by Liebig. Two main classifications of such processes are now employed: one in which the temperature is held at about atmospheric, and the other, the hot process, wherein the temperature is elevated. The solutions employed are somewhat different.

It is also usual to coat the silvered surface with shellac and paint or other organic coating compositions. Such coatings are frequently filled with metallic powder such as aluminum, bronze, or copper powder and sometimes filled with fillers such as calcium carbonate.

The usual practice heretofore employed in removing such silver from the glass in order to reclaim the glass and the silver involves a removal of the organic coating by caustic alkali and the subsequent corrosion, i. e., solution, of the silver by means of corrosive acids such as sulphuric, nitric or hydrochloric mixed with nitric acid. The conventional commercial method heretofore employed is illustrated by the following procedure:

The silver backing of the mirror is scrubbed with caustic soda and allowed to stand from 45 minutes to an hour in contact with the caustic soda. This usually loosens the paint and shellac which are rinsed off with a garden hose. Hydrochloric acid is then applied and the silver is scrubbed with a brush. This usually takes from about 15 to 20 minutes. The excess acid is washed off. Instead of muriatic acid, sulphuric acid or nitric acid may be employed. All such acids act to corrode or eat away the silver by solution thereof or conversion into a salt. Not only is this process slow and costly and results in the formation of impure dilute solutions and suspension of silver salts which are difficult to reclaim, but also the corrosive nature of the acids requires the use of wooden tanks since steel tanks corrode. Wooden tanks deteriorate rapidly in this service. The process is also a health hazard since the mirrors must be scrubbed with caustic alkali and then with acid.

We have found that we can remove the silver from a silvered mirror without material corrosion or solution of the silver. The silver is removed as metallic silver in relatively large strips or sheets. We may thus speed up to a great extent the process of the removal of such silver and recover the silver as silver, i. e., without destroying the metallic nature thereof. Instead of corroding the silver we destroy the bond between the metallic silver film and the glass and thus permit the metallic film to be removed from the glass surface without material destruction of the nature of the silver forming the film.

We have found that an alkaline solution of an organic compound containing the sulfhydryl group (SH) is effective in the separation of the silver film of mirrors formed by the above procedures without any substantial destruction or corrosion by the solution of the metallic silver. The silver is removed as metallic silver. Apparently these compounds act to penetrate between the glass and the silver film and separate the metallic silver from the glass backing by destroying the bond between the glass and the metallic silver. It may thus act by a physicochemical process rather than by chemical destruction of the silver film as in the case of the corrosive acids heretofore used.

In our process for stripping mirrors we immerse the mirrors in a solution of such sulfhydryl containing compounds preferably in the form of their soluble salts. Such sulfhydryl compounds may be those more specifically set forth below:

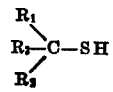

where $R_1$; $R_2$; and $R_3$ may be hydrogen, or one or both $R_1$ and $R_2$ may be hydrogen and $R_3$ may be, or $R_2$ and $R_3$ may each be, or $R_1$ and $R_2$ and $R_3$ may each be an alkyl, aryl, aralkyl, alicyclic or heterocyclic group or such substituted group; and also wherein $R_2$ and $R_3$ or $R_1$ and $R_3$ or $R_1$ and $R_2$ or $R_1$ and $R_2$ and $R_3$ may be joined in an aromatic, alicyclic or heterocyclic group.

One or more of the groups $R_1$, $R_2$ and $R_3$ may be an alkanol group, as, for example, the thioglycols of which monothioglycol $HOC_2H_4SH$, thioglycerol, $HSCH_2C_2H_3(OH)_2$, or their homologues or analogues, or the hydroxy substituted aryl mercaptans such as 1-4 monothio hydroquinone ($HSC_6H_4OH$).

One or more of the groups $R_1$, $R_2$ or $R_3$ may be a carboxyl or a carboxyl substituted alkyl, as in the case of thioglycolic acid ($HSCH_2COOH$), thiolactic $CH_3CH(SH)COOH$, or thiomalic acid $HSC_2H_3(COOH)_2$ or their homologues and analogues, or the sulfhydryl substituted aromatics carboxylic acids such as thiosuccinic acid $HSC_6H_4COOH$.

Such compounds include the mercaptans, such as methyl, ethyl, or propyl mercaptans, or such substituted mercaptains, or the aryl mercaptains, thiophenol, thiocresol, or thioxylol, or thionaphthol, the alkyl aryl mercaptans, such as benzyl mercaptans and their homologues and analogues.

Such compounds from specific exemplifications of the formula $R_1R_2R_3CSH$ which include mirror stripping agents which are the salts of such sulfhydryl containing compounds generally definable as one in which $R_1$ is hydrogen, alkyl, aryl, aralkyl, alicyclic, heterocyclic, alkoxy, phenoxy, alkenol, phenolic, or carboxylic group or such group substituted, and where $R_2$ and $R_3$ are similar to $R_1$ except that at least one of the groups $R_1$, $R_2$, and $R_3$ is not hydrogen and both of the other groups are hydrogen.

In all such cases there is present the C—SH group which appears to be the active group.

Derivatives of this grouping, for instance, the grouping S=C—SH, as in the xanthates, are also useful for this purpose. These may be considered as derivatives of the formulation $R_1R_2R_3CSH$ in which $R_1$ and $R_2$ are replaced by S as in the case of the grouping

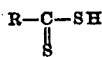

where R has the same significance as $R_3$.

Examples of such materials are the ethyl xanthate, $C_2H_5OC(S)SH$, in the form of the salts or analogous or homologous compound in which the ethyl group is replaced by another alkyl group such as amylxanthate, di-isopropyl xanthate, butyl xanthate, benzoyl ethyl xanthate, particularly in the form of their salts.

The activity of the compounds in the group $R_1R_2R_3CSH$ as above is increased by the presence of amino or imido nitrogen linked to the carbon which is also linked to the sulfhydryl group as in the grouping

or the

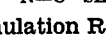

Thus in the formulation $R_1R_2R_3CSH$, one, two, or all of the groups $R_1$, $R_2$, and $R_3$ may be amino or imido group or an N substituted or amino or imido group. This is exemplified by the thioureas and the N-substituted thioureas, for example, the alkyl or an aryl N-substituted thiourea, as, for example, phenylthiourea, ditolylthiourea, dibutyl thiourea. In the presence of an alkali the ureas react as if they contained such a thiolcarbamic group

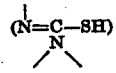

The presence of a sulfide

linkage in the grouping is also an advantage. Thus in the compounds illustrated by the formula $R_1R_2R_3CSH$, as described above, where $R_1$ and $R_2$ are replaced by S as in

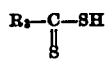

$R_3$ is amino or N substituted amino.

Such compounds of this nature are represented by compounds containing the dithio carbamic grouping as

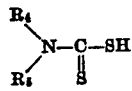

where $R_4$ and $R_5$ are either H or alkyl, aryl or arylalkyl, or may be alicyclic or heterocyclic or so cyclic with the N and/or C in the ring, groups or substituents thereof. Useful examples of this grouping are the dithio carbamic acid, $NH_2C(S)SH$ or the N substituted dithio carbamic acids in which one or both of the hydrogens of the amino group are substituted by alkyl and/or aryl or aralkyl or alicyclic or heterocyclic substituents; for example, the N-dimethyl dithio carbamic $(CH_3)_2NC(S)SH$, or the phenyl methyl dithio carbamic acid $(C_6H_5)(CH_3NC(S)SH)$.

The sulfur in the formulation $R_4R_5H—C(S)SH$ need not be doubly linked to the carbon but may be singly linked as in the thiazole linkage. Such compounds are exemplified by the mercapto thiazoles have a grouping

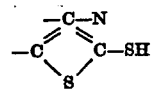

exemplified by mercapto benzothiazole

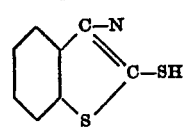

or the mercaptonaphthyl thiazole.

In all such cases the active group is the C—SH or such group reinforced by a second sulfur and/or such group reinforced by a nitrogen linked to the C which is in turn linked to the SH group.

Such compounds are preferably employed in the form of the salts, for example, the alkali metal or ammonium or amino or substituted amino salts, and preferably in alkaline water solution.

It has been found that alkaline solutions of such sulfhydryl (i. e., in the form of their sodium, potassium, lithium, strontium, or ammonium salt) act very efficiently in the separation of the silver mirror backing without the destruction of the metallic nature of the silver and without substantial corrosion or solution thereof, to remove the silver film in large strips or sheets.

In carrying out the process employing these materials the solution of these materials in the alkali is in concentrations varying from about 1% up to saturation. It is employed at temperatures ranging from atmospheric up to the boiling point, preferably up to about 200° F., the higher the temperature the more rapid the action but with the more active material the treatment at atmospheric temperature is sufficient. The silver mirror sloughs off in large pieces without any substantial destruction of the metallic nature of the silver.

Where the silver mirror is backed with shellac or paint coating or other organic coating, such as a synthetic resin coating, it may be found useful to employ coating softening or removing solvents along with the sulfhydryl compounds in order to destroy the integrity of the organic coating in amounts ranging from about 5% to about 50% of the water solution. Those solvents such as are used in the paint removing industry are useful.

The softening agent or solvent for the paint or other organic coating may be miscible or non-miscible with water solution of the reagent. Either of them is useful in destroying the integrity of the mirror backing or coating.

It is therefore possible to use any of the conventional paint removing solvents and the shellac removing solvents which have been employed heretofore in the paint and shellac removing art and the identification or selection of the particular organic solvents to be employed in our composition will depend upon the specific nature of the organic coating employed with the mirror. Thus, where the coating is of a synthetic resin type or synthetic resin lacquer, one may select any of the solvents listed by Simonds and Ellis in their Handbook of Plastics, published by Van Nostrand Co., 7the printing, pages 240 to 249, and select the particular solvent by reference to the solubility therein of the particular resin type employed in organic coatings, and said list is hereby incorporated by reference.

Where the coating is of the shellac type or oil paint type, a suitable alcohol or glycol or glycol ether or other ether may be employed. For example, we may employ monohydric and polyhydric alcohol, such as methyl, ethyl, propyl, or isopropyl alcohol, and employ also the polyhydric alcohols, such as glycol or glycerine and the ethers of such glycols, for example, ethylene glycol, propylene glycol, diethylene glycol, hexane 1,2 diol, diethylene glycol, polyethylene glycol, glycerine, the glycol ethers, such as ethylene glycol monoethyl ether, ethylene glycol monobutyl ether, ethylene glycol monopropyl ether. We may employ the ketones, such as acetone, methyl ethyl ketone, diethyl ketone, diacetone, acetonyl acetone, isophorone, diacetone alcohol. We may employ the chlorinated compounds, such as methylene chloride, ethylene chloride, trichlorethylene, dichlorethylene, monochlor benzene and dichlor benzene. All of these are listed merely to illustrate the nature of the solvents employed and are not intended to limit the scope of the invention to such listed compounds. All of such compounds have solvent action for the protective films as described above.

It has been found desirable to choose from the above solvents, when the process is to be carried out at an elevated temperature, those solvents whose flash point is sufficiently high to be safe at the elevated temperature employed. Thus, when the solvent is miscible with water the flash point (determined by the Cleveland open cup method) should be 150° F., and if not miscible with water, 200° F., when using these materials in the process at temperatures specified below as suitable, i. e., 160° to 190° F.

It is, of course, desirable to avoid using solvents which are reacted with the compounds employed, although solvents which are amines, although reactive with the sulfhydryl group to form salts may be employed especially in the presence of an excess of alkali.

When employing these reagents on mirrors coated with paint or shellac and where the compound is alkaline with ammonium, potassium or sodium hydroxide, the paint removing solvents may be omitted. The alkaline solution, especially if the alkalinity is sufficient, itself destroys the integrity of the film of organic coating, and the organic coating and the silver film are sloughed off from the glass mirror by the action of the sulfhydryl compound.

The activity of the compounds previously referred to are exemplified in the following examples given by way of illustration, and not as limitation of our invention.

*Example 1*

5 parts of potassium ethyl xanthate are dissolved in 85 parts of distilled water to which are added 10 parts of a 50% solution of sodium hydroxide.

A silver mirror which was not coated by an organic coating was immersed in this solution at a temperature of 175° F. and was fully stripped of the silver film in 3 to 4 minutes. The mirror was then removed and washed to leave the glass free of silver film.

Another solution having the same composition as the previous solution but containing 5 parts of potassium amyl xanthate instead of the potassium ethyl xanthate was employed to strip a like mirror at the same temperature. It was stripped in like manner in from about 8 to 10 minutes.

*Example 2*

As illustrating the effectiveness of the carboxyl substituted compounds containing the sulfhydryl group, the following is an illustrative example:

A solution composed of 5 parts of thiomalic acid and 85 parts by weight of distilled water and 10 parts by weight of a 50% solution of NaOH was employed in place of the reagent of Example 1. The silver was stripped in about 1 minute.

*Example 3*

A solution formed of 10 parts by weight of 50% sodium hydroxide; 85 parts by weight of distilled water; and 5 parts by weight of thiourea was employed to treat a mirror such as described in Example 1 at a temperature of 175° F. It stripped the mirror in about 45 minutes.

As illustrating the effectiveness of the thiourea of the sulfhydryl compounds in removing the backing from mirrors where an excess of alkali was employed and where they were applied to mirrors coated with organic coatings, the following examples are given:

A mirror which had been painted with an oil paint coating was exposed at a temperature of 140° F. to a solution composed of 20% by weight of a 50% solution of sodium hydroxide; 72% by weight of distilled water; and 8% by weight of thiourea. The mirror and paint coating were completely stripped from the mirror backing in about 5 minutes.

The concentration of the thiourea may be reduced to as low as 1% and may be increased to the saturation value or 10 or 15% of thiourea will be sufficient in the presence of the excess alkali. For example, a solution composed of 1.6 parts by weight of thiourea; 16.8 parts by weight of 50% solution of sodium hydroxide; and 81.6 parts by weight of distilled water was employed in the above process, and the mirror and paint backing were stripped completely in about 15 minutes when employed at the temperatures previously specified.

*Example 4*

As an example of the use of a substituted thiourea the following is illustrative:
Ethylene thiourea, i. e., 2 thio imidazole

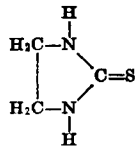

*Example 5*

As an example of the thiazole type of compound the following is illustrative:
2 parts by weight of the ammonium salt of mercapto benzothiazole

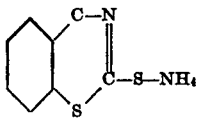

was dissolved in 85 parts by weight of distilled water to which 10 parts by weight of a 50% solution of sodium hydroxide was added. The process of Example 1 was carried out employing the above treating agent. The mirror was stripped in about 30 minutes.

The concentration of the organic compound containing the sulfhydryl group may vary up to the saturation value of the compound and usefully from .5 to 25% by weight. The alkali should be employed in amount sufficient to give a strong alkaline reaction to the solution. From 5 to 25% of free alkali (i. e., of the hydroxides of the alkali metal or ammonia) is sufficient for all practical purposes.

While we have described a particular embodiment of our invention for the purpose of illustration, it should be understood that various modifications and adaptations thereof may be made within the spirit of the invention as set forth in the appended claims.

We claim:

1. A mirror stripping agent comprising an alkaline water solution of a salt of an organic compound containing a CSH group and an organic coating removing solvent.

2. A mirror stripping agent comprising an alkaline solution of a salt of a compound having the general formula $R_1R_2R_3CSH$ where $R_1$ and $R_2$ are chosen from the group consisting of hydrogen, alkyl, aryl, aralkyl, alicyclic, heterocyclic, alkoxy, phenoxy, alkenol, phenolic, carboxylic groups and substituents thereof, and where $R_3$ is chosen from the group consisting of an alkyl, aryl, aralkyl, alicyclic, heterocyclic, alkoxy, alkenol, phenol carboxylic, carboxylic groups and substituents thereof and an organic coating removing solvent.

3. A mirror stripping agent comprising an alkaline water solution of a salt of an organic compound containing the group

and an organic coating removing solvent.

4. The compound as defined in claim 2 in which the groups $R_1$ and $R_2$ are replaced by an S joined to the carbon.

5. The compound as defined in claim 2 in which $R_1$ and $R_2$ and $R_3$ are chosen from the group consisting of amino, imido, N substituted amino and N substituted imido group.

6. The compound as defined in claim 2 in which $R_1$ and $R_2$ are replaced by S and $R_3$ is chosen from the group consisting of an amino, imido, N substituted amino and N substituted imido group.

7. The compound as defined in claim 2 in which $R_1$ and $R_2$ are replaced by S and $R_3$ is an N substituted imido group linked to the S in ring formation.

8. A mirror stripping agent comprising an alkaline water solution of a salt chosen from the group consisting of an alkali metal and ammonium salt of an organic compound containing ROC—S—H where R is an alkyl radical and an organic coating removing solvent.

9. A mirror stripping agent comprising an alkaline water solution of ethylene thiourea and an organic coating removing solvent.

10. A mirror stripping agent comprising an alkaline water solution, thiourea, and an organic coating removing solvent.

11. A mirror stripping agent comprising an alkaline solution of thiomalic acid and an organic coating removing solvent.

12. A mirror stripping agent comprising an alkaline solution of mercapto benzothiazole and an organic coating removing solvent.

13. A solution as described in claim 1 in which the alkalinity is equivalent to from 1 to 25% of an alkali chosen from the group consisting of alkali metal hydroxide and ammonium hydroxide and the organic compound is equivalent to from 1 to 25% by weight.

14. A solution as described in claim 2 in which the alkalinity is equivalent to from 1 to 25% of an alkali chosen from the group consisting of alkali metal hydroxide and ammonium hydroxide and the organic compound is equivalent to from 1 to 25% by weight.

15. A mirror stripping agent comprising a solution as described in claim 3 in which the alkalinity is equivalent to from 1 to 25% of an alkali chosen from the group consisting of alkali metal hydroxide and ammonium hydroxide and the organic compound is equivalent to from 1 to 25% by weight.

16. A mirror stripping agent comprising a solution as described in claim 4 in which the alkalinity is equivalent to from 1 to 25% of an alkali chosen from the group consisting of alkali metal hydroxide and ammonium hydroxide and the organic compound is equivalent to from 1 to 25% by weight.

17. A mirror stripping agent comprising a solution as described in claim 5 in which the alkalinity is equivalent to from 1 to 25% of an alkali chosen from the group consisting of alkali metal hydroxide and ammonium hydroxide and the organic compound is equivalent to from 1 to 25% by weight.

18. A mirror stripping agent comprising a solution as described in claim 6 in which the alkalinity is equivalent to from 1 to 25% of an alkali chosen from the group consisting of alkali metal hydroxide and ammonium hydroxide and the organic compound is equivalent to from 1 to 25% by weight.

19. A mirror stripping agent comprising a solution as described in claim 7 in which the alkalinity is equivalent to from 1 to 25% of an alkali chosen from the group consisting of alkali metal hydroxide and ammonium hydroxide and the organic compound is equivalent to from 1 to 25% by weight.

20. A mirror stripping agent comprising a solution as described in claim 8 in which the alkalinity is equivalent to from 1 to 25% of an alkali chosen from the group consisting of alkali metal hydroxide and ammonium hydroxide and the organic compound is equivalent to from 1 to 25% by weight.

21. A mirror stripping agent comprising a solution as described in claim 9 in which the alkalinity is equivalent to from 1 to 25% of an alkali chosen from the group consisting of alkali metal hydroxide and ammonium hydroxide and the organic compound is equivalent to from 1 to 25% by weight.

22. A mirror stripping agent comprising a solution as described in claim 10 in which the alkalinity is equivalent to from 1 to 25% of an alkali chosen from the group consisting of alkali metal hydroxide and ammonium hydroxide and the organic compound is equivalent to from 1 to 25% by weight.

23. A mirror stripping agent comprising a solution as described in claim 11 in which the alkalinity is equivalent to from 1 to 25% of an alkali chosen from the group consisting of alkali metal hydroxide and ammonium hydroxide and the organic compound is equivalent to from 1 to 25% by weight.

24. A process for stripping mirrors which comprises immersing said mirrors in an alkaline water solution of a salt of an organic compound containing a CSH group and an organic coating solvent remover at a temperature ranging from atmospheric to 200° F., and stripping the mirror film from said mirror.

25. A process for stripping mirrors which comprises immersing said mirrors in an alkaline water solution of a salt of a compound having the general formula $R_1R_2R_3CSH$ where $R_1$ and $R_2$ are chosen from the group consisting of hydrogen, alkyl, aryl, aralkyl, alicyclic, heterocyclic, alkoxy, phenoxy, alkenol, phenolic, carboxylic groups and substituents thereof, and where $R_3$ is chosen from the group consisting of an alkyl, aryl, aralkyl, alicyclic and heterocyclic, alkoxy, alkenol, phenol carboxylic, carboxylic groups and substituents thereof at a temperature ranging from atmospheric to 200° F., and stripping the mirror film from said mirror.

26. A process for stripping mirrors which comprises immersing said mirrors in an alkaline water solution of a salt of an organic compound containing the group

at a temperature ranging from atmospheric to 200° F., and stripping the mirror film from said mirrors.

27. A process for stripping mirrors which comprises immersing said mirrors in an alkaline solution of a salt of a compound having the general formula $R_1R_2R_3CSH$ where $R_1$ and $R_2$ are replaced by an S joined to the carbon, and where $R_3$ is chosen from the group consisting of an alkyl, aryl, aralkyl, alicyclic and heterocyclic, alkoxy, alkenol, phenol carboxylic groups and substituents thereof at a temperature ranging from atmospheric to 200° F., and stripping the mirror film from said mirrors.

28. A process for stripping mirrors which comprises immersing said mirrors in an alkaline solution of a salt of a compound having the general formula $R_1R_2R_3CSH$ where $R_1$, $R_2$ and $R_3$ chosen from the group consisting of amino, imido, N substituted amino, and N substituted imido group, at a temperature ranging from atmospheric to 200° F., and stripping the mirror film from said mirrors.

29. A process for stripping mirrors which comprises immersing said mirrors in an alkaline solution of a salt of a compound having the general formula $R_1R_2R_3CSH$, where $R_1$ and $R_2$ are replaced by S, and $R_3$ is chosen from the group consisting of an amino, imido, N substituted amino and N substituted imido group, at a temperature ranging from atmospheric to 200° F., and stripping the mirror film from said mirrors.

30. A process for stripping mirrors which comprises immersing said mirrors in an alkaline solution of a salt of a compound having the general formula $R_1R_2R_3CSH$, where $R_1$ and $R_2$ are replaced by S, and $R_3$ is an N substituted imido group linked to the S in ring formation, at a temperature ranging from atmospheric to 200° F., and stripping the mirror film from said mirrors.

31. A process for stripping mirrors which comprises immersing said mirrors in an alkaline water solution of a salt chosen from the group consisting of an alkali metal and ammonium salt of an organic compound containing ROC—S—H, where R is an alkyl radical, at a temperature ranging from atmospheric to 200° F., and stripping the mirror film from said mirrors.

32. A process for stripping mirrors which comprises immersing said mirrors in an alkaline water solution of ethylene thiourea, at a temperature ranging from atmospheric to 200° F., and stripping the mirror film from said mirrors.

33. A process for stripping mirrors which comprises immersing said mirrors in an alkaline water solution of thiourea at a temperature ranging from atmospheric to 200° F., and stripping the mirror film from said mirrors.

34. A process for stripping mirrors which comprises immersing said mirrors in an alkaline solution of thiomalic acid at a temperature ranging from atmospheric to 200° F., and stripping the mirror film from said mirrors.

35. A process for stripping mirrors which comprises immersing said mirrors in an alkaline solution of mercapto benzothiazole at a temperature ranging from atmospheric to 200° F., and stripping the mirror film from said mirrors.

36. A process for stripping mirrors which comprises immersing said mirrors in an alkaline water solution of a salt of an organic compound containing a CSH group in which the alkalinity is equivalent to from 1 to 25% of an hydroxide chosen from the group consisting of alkali metal hydroxide and ammonium hydroxide and the organic compound is equivalent to from 1 to 25% by weight at a temperature ranging from atmospheric to 200° F., and stripping the mirror film from said mirrors.

37. A process for stripping mirrors which comprises immersing said mirrors in an alkaline solution of a salt of a compound having the general formula $R_1R_2R_3CSH$, where $R_1$ and $R_2$ are chosen from the group consisting of hydrogen, alkyl, aryl, aralkyl, alicyclic, heterocyclic, alkoxy, phenoxy, alkenol, phenolic, carboxylic and substituents thereof, and where $R_3$ is chosen from the group consisting of an alkyl, aryl, aralkyl, alicyclic, heterocyclic, alkoxy, alkenol, phenol carboxylic, carboxylic and substituents thereof, in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

38. A process for stripping mirrors which comprises immersing said mirrors in an alkaline water solution of a salt of an organic compound containing the group

in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

39. A process for stripping mirrors which comprises immersing said mirrors in an alkaline solution of a salt of a compound having the general formula RSCSH, where R is chosen from the group consisting of an alkyl, aryl, aralkyl, alicyclic, heterocyclic, alkoxy, alkenol, phenol carboxylic, carboxylic groups and substituents thereof, in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

40. A process for stripping mirrors which comprises immersing said mirrors in an alkaline solution of a salt of a compound having the general formula $R_1R_2R_3CSH$, where $R_1$, $R_2$ and $R_3$ is chosen from the group consisting of amino, imido, N substituted amino and N substituted imido groups, in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

41. A process for stripping mirrors which comprises immersing said mirrors in an alkaline solution of a salt of a compound having the general formula $R_1R_2R_3CSH$, where $R_1$ and $R_2$ are replaced by S and $R_3$ is chosen from the group consisting of an amino, imido, N substituted amino and N substituted imido groups, in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

42. A process for stripping mirrors which comprises immersing said mirrors in an alkaline solution of a salt of a compound having the general formula $R_1R_2R_3CSH$, where $R_1$ and $R_2$ are replaced by S and $R_3$ is an N substituted imido group linked to the S in ring formation in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

43. A process for stripping mirrors which comprises immersing said mirrors in an alkaline water solution of a salt chosen from the group consisting of an alkali metal and ammonium salt of an organic compound containing ROC—S—H, where R is an alkyl radical in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

44. A process for stripping mirrors which comprises immersing said mirrors in an alkaline water solution of ethylene thiourea in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

45. A process for stripping mirrors which comprises immersing said mirrors in an alkaline water solution of thiourea, in which the alkalinity is equivalent to from 1 to 25% of an hydroxide chosen from the group consisting of an alkali metal hydroxide and ammonium hydroxide and the organic compound is equivalent to from 1 to 25% by weight, at a temperature ranging from atmospheric to 200° F., and stripping the mirror film from said mirrors.

KEITH E. BROWN.
FRANCIS E. CLARK.
CLARK E. JACKSON.

REFERENCES CITED

The following references are of record in the file of this patent:

UNITED STATES PATENTS

| Number | Name | Date |
|---|---|---|
| 242,338 | Laval | May 31, 1881 |
| 2,406,458 | Gerndt et al. | Aug. 27, 1946 |